United States Patent
Long et al.

(10) Patent No.: US 8,712,666 B2
(45) Date of Patent: Apr. 29, 2014

(54) MULTIPLE-FREQUENCY INVERSION METHOD AND CONTROL APPARATUS FOR INTERNAL COMBUSTION ENGINE DRIVEN GENERATOR

(75) Inventors: Yu Long, Chongqing (CN); Hui Tian, Chongqing (CN)

(73) Assignee: Loncin Motor Co., Ltd., Jiulongpo District, Chongqing (CN)

( * ) Notice: Subject to any disclaimer, the term of this patent is extended or adjusted under 35 U.S.C. 154(b) by 0 days.

(21) Appl. No.: 14/005,281

(22) PCT Filed: Mar. 1, 2012

(86) PCT No.: PCT/CN2012/071832
§ 371 (c)(1),
(2), (4) Date: Sep. 16, 2013

(87) PCT Pub. No.: WO2012/122895
PCT Pub. Date: Sep. 20, 2012

(65) Prior Publication Data
US 2014/0001770 A1    Jan. 2, 2014

(30) Foreign Application Priority Data

Mar. 15, 2011 (CN) .......................... 2011 1 0060848

(51) Int. Cl.
*H02M 5/44* (2006.01)
*H02M 9/04* (2006.01)
*F02N 11/04* (2006.01)

(52) U.S. Cl.
USPC .......................................... 701/101; 290/40 B

(58) Field of Classification Search
USPC .................. 701/101, 102, 115; 290/27, 40 B; 363/37, 65, 71
See application file for complete search history.

(56) References Cited

U.S. PATENT DOCUMENTS

| 3,713,355 A * | 1/1973 | Wakamatsu et al. .......... 477/132 |
| 4,490,666 A | 12/1984 | Tanamachi et al. |
| 6,541,876 B2 * | 4/2003 | Shimizu et al. ............. 290/40 B |
| 8,638,003 B2 * | 1/2014 | Hashimoto et al. ............. 290/27 |
| 2002/0000722 A1 | 1/2002 | Shimizu et al. |

FOREIGN PATENT DOCUMENTS

| CN | 1330449 A | 1/2002 |
| CN | 2854922 Y | 1/2007 |
| CN | 2888737 Y | 4/2007 |
| CN | 101691116 A | 4/2010 |
| CN | 102312737 A | 1/2012 |

* cited by examiner

*Primary Examiner* — Hieu T Vo
(74) *Attorney, Agent, or Firm* — Fraser Clemens Martin & Miller LLC; J. Douglas Miller

(57) ABSTRACT

A multiple-frequency inversion method and a control apparatus for an internal combustion engine driven generator includes an inverter unit that employs a multiple-frequency inversion technology, controlling the inverter unit through a low switching frequency f to obtain a 2f modulated frequency, thus resolving the problem that a low frequency switching component generates a high frequency modulated waveform. Four switching devices in the inverter unit have the same working frequency, alleviating the controller load. In addition, a high modulated frequency reduces the device parameters of the filter unit, resulting in a smaller-sized and lighter apparatus, thus giving the generator portability. Reduction of the device parameters of the filter unit means reduction of the output internal resistance of the generator, therefore increasing the non-linear load capability of the generator.

16 Claims, 5 Drawing Sheets

MULTIPLE-FREQUENCY INVERSION METHOD AND CONTROL APPARATUS FOR INTERNAL COMBUSTION ENGINE DRIVEN GENERATOR

TECHNICAL FIELD OF THE INVENTION

The present invention relates to the technical field of generator control, and in particular to a multiple-frequency inversion method and a control apparatus for an internal combustion engine driven generator.

BACKGROUND OF THE INVENTION

Components and working principles of an internal combustion engine driven generator will be introduced first below.

Referring to FIG. 1, the figure is a structural diagram of an internal combustion engine driven generator in the prior art.

An internal combustion engine 101, functioning as a prime motor, drives a generator 102 to generate electricity. An alternating current outputted by the generator 102 is rectified into a direct current by a rectifying unit 103, and the direct current is outputted to an inverter unit 104 subsequently. Controlled by a controller 105, the inverter unit 104 inverts the direct current into a required alternating current which is provided to a load after being filtered by a filter unit 106. At the same time, the controller 105 controls the opening degree of the throttle of the internal combustion engine 101 through a throttle controller 107.

A common inversion technology applied in the prior art results in relatively large device parameters in the subsequent filter unit, further causing relatively large output internal resistance of the generator and relatively low non-linear load capability.

SUMMARY OF THE INVENTION

A solution to solve the technical problem of the present invention is to provide a multiple-frequency inversion method and a control apparatus for an internal combustion engine driven generator so as to reduce device parameters in a filter unit and internal resistance of a generator and provide non-linear load capability.

The present invention provides a multiple-frequency inversion method for an internal combustion engine driven generator, comprising: rectifying the output voltage of a filter unit; after performing analog-to-digital conversion for the rectified output voltage, calculating the average value of the output voltage or the effective value of the output voltage; comparing the average value of the output voltage with a target voltage value or compare the effective value of the output voltage with a target voltage value; according to the comparison results, adjusting the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching devices in an inverter unit to enable the inverter unit to output modulated wave with a pulse frequency 2f.

Preferably, the multiple-frequency inversion method further comprising: performing positive amplitude conversion for the output current of the filter unit; subtracting a reference value from the output current having undergone the positive amplitude conversion; performing analog-to-digital conversion for the output current with the reference value subtracted and then calculate an effective value of the output current; according to the effective value of the output current, looking up a preset revolving speed-current curve to obtain a corresponding target revolving speed; controlling the opening degree of the throttle of the internal combustion engine so that the revolving speed of the internal combustion engine reaches the target revolving speed.

Preferably, the filter unit is a LC low-pass filter.

The present invention further provides a multiple-frequency inversion apparatus for an internal combustion engine driven generator, comprising: an output voltage rectifying unit configured to rectify the output voltage of a filter unit; an output voltage analog-to-digital conversion unit configured to perform analog-to-digital conversion for the rectified output voltage; an output voltage calculating unit configured to calculate the average value of the output voltage or an effective value for the output voltage according to the output voltage having undergone the analog-to-digital conversion; a comparing unit configured to compare the average value of the output voltage with a target voltage value or compare the effective value of the output voltage with a target voltage value; a control unit configured to, according to the comparison results, adjusting the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching devices in an inverter unit to enable the inverter unit to output modulated wave with a pulse frequency 2f.

Preferably, the multiple-frequency inversion apparatus further comprising: a positive amplitude conversion unit configured to perform positive amplitude conversion for the output current of the filter unit; a subtracting unit configured to subtract a reference value from the output current having undergone the positive amplitude conversion; an output current analog-to-digital conversion configured to perform analog-to-digital conversion for the output current with the reference value subtracted; an output current effective value calculating unit configured to calculate the effective value of the output current according to the output current having undergone the analog-to-digital conversion; a target revolving speed looking up unit configured to, according to the effective value of the output current, look up a preset revolving speed-current curve to obtain a corresponding target revolving speed; a throttle opening degree control unit configured to control the opening degree of the throttle of the internal combustion engine so that the revolving speed of the internal combustion engine reaches the target revolving speed.

Preferably, the filter unit is a LC low-pass filter.

The present invention further provides a control method for an internal combustion engine driven generator. The internal combustion engine, which functions as a prime motor, drives the generator to generate electricity. An alternating current outputted by the generator is rectified into a direct current by a rectifying unit, and the direct current is outputted to an inverter unit subsequently. Controlled by a controller, the inverter unit inverts the direct current into a required alternating current which is provided to a load after being filtered by a filter unit. The controller controls the opening degree of the throttle of the internal combustion engine through a throttle controller so as to control the output current. The controller controls the states of switching devices of the inverter unit through PWM wave, comprising: rectifying the output voltage of the filter unit over again, after performing analog-to-digital conversion for the rectified output voltage, calculate the average value or the effective value of the output voltage; comparing the average value of the output voltage with a target value thereof or compare the effective value of the output voltage with a target value thereof; according to the comparison results, adjusting the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching devices in an inverter unit to enable the inverter unit to output modulated wave with a pulse frequency 2f.

The present invention further provides a control apparatus for an internal combustion engine driven generator, configured to control the internal combustion engine driven generator, wherein the internal combustion engine, which functions as a prime motor, drives the generator to generate electricity. An alternating current outputted by the generator is rectified into a direct current by a rectifying unit, and the direct current is outputted to an inverter unit subsequently. Controlled by a controller, the inverter unit inverts the direct current into a required alternating current which is provided to a load after being filtered by a filter unit. The controller controls the opening degree of the throttle of the internal combustion engine through a throttle controller so as to control the output current. The controller controls the states of switching devices of the inverter unit through PWM wave, wherein the apparatus comprises: an output voltage calculating unit configured to rectify the output voltage of the filter unit over again, after performing analog-to-digital conversion for the rectified output voltage, calculate the average value or the effective value of the output voltage; a comparing unit configured to compare the average value of the output voltage with a target value thereof or compare the effective value of the output voltage with a target value thereof; a control unit configured to, according to the comparison results, adjust the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching devices in an inverter unit to enable the inverter unit to output modulated wave with a pulse frequency 2f.

Compared with the prior art, the present invention has the following advantages: according to the multiple-frequency inversion method and the control apparatus for an internal combustion engine driven generator of the present invention, an inverter unit employs a multiple-frequency inversion technology, controlling the inverter unit through a low switching frequency f to obtain a 2f modulated frequency, thus resolving the problem that a low frequency switching component generates a high frequency modulated waveform. Four switching devices in the inverter unit have the same working frequency, alleviating the controller load. In addition, a high modulated frequency reduces the device parameters of the filter unit, resulting in a smaller-sized and lighter apparatus, thus giving the generator portability. Reduction of the device parameters of the filter unit means reduction of the output internal resistance of the generator, therefore increasing the non-linear load capability of the generator and ensuring a good sinusoidal voltage of the generator with a load with a large harmonic current.

DETAILED DESCRIPTION OF THE INVENTION

To make the purpose, features and advantages of the present invention more apparent and easily understood, specific embodiments of the present invention will be described in details below in combination with the accompanying drawings.

Figure 1:
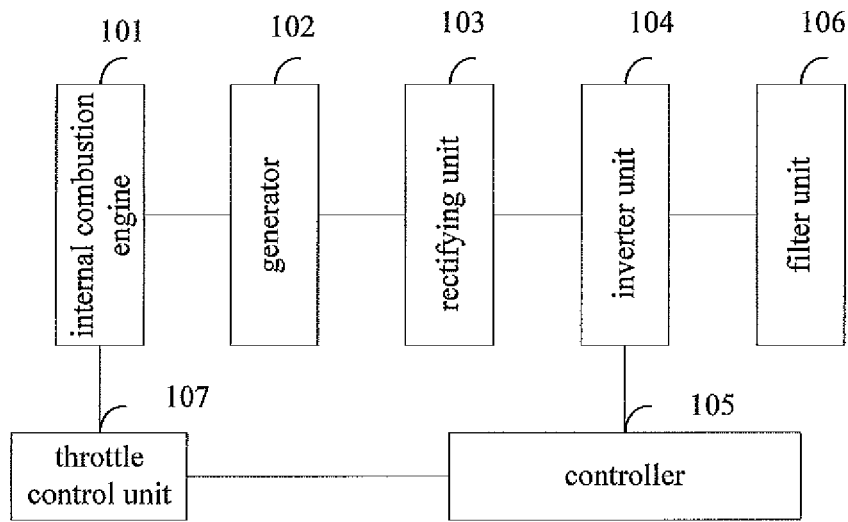
FIG. 1 is a structural diagram of an internal combustion engine driven generator in the prior art.
Figure 2:
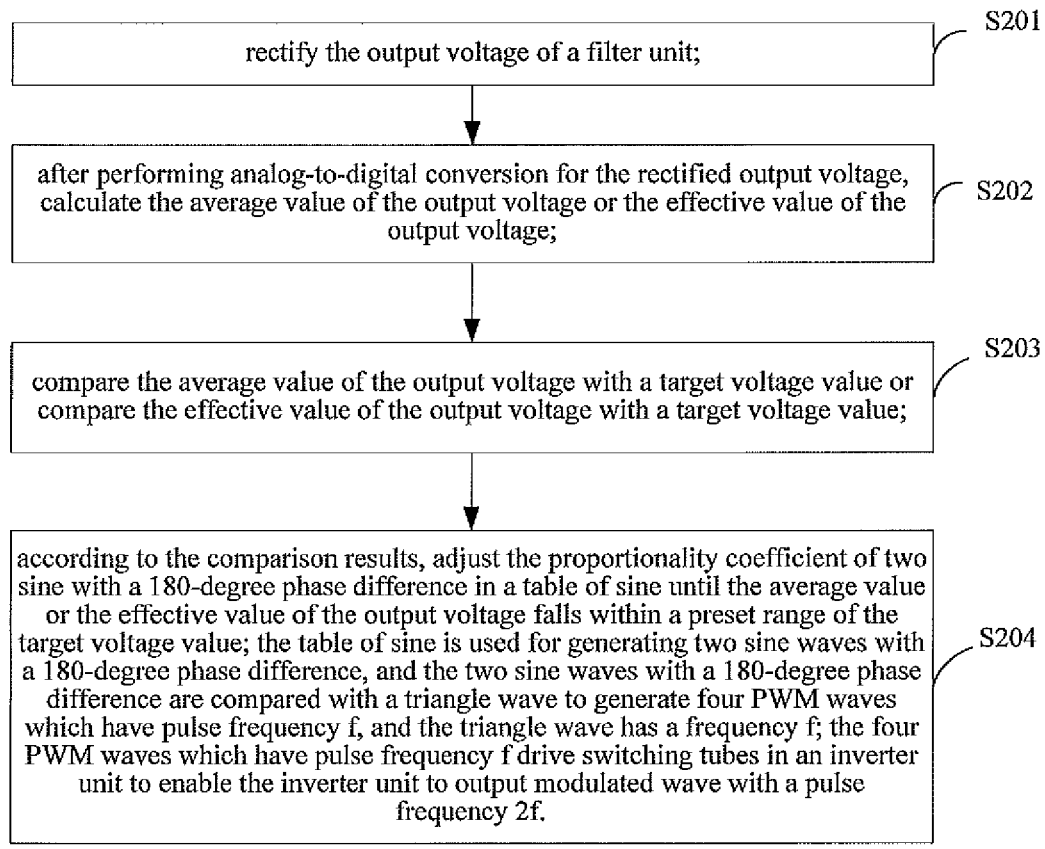
FIG. 2 is a flowchart of the first embodiment of a multiple-frequency inversion method of an internal combustion engine driven generator of the present invention.

Referring to FIG. 2, the figure is a flowchart of the first embodiment of a multiple-frequency inversion method of an internal combustion engine driven generator of the present invention.

The multiple-frequency inversion method of the internal combustion engine driven generator in the present embodiment includes:

Step 201: rectify the output voltage of a filter unit; since a controller can only acquire a positive value, an alternating current output voltage needs to be rectified and converted into a positive output voltage to be acquired.

Step 202: after performing analog-to-digital conversion for the rectified output voltage, calculate the average value of the output voltage or the effective value of the output voltage; analog-to-digital conversion is performed for the analog output voltage by an AD, so that the controller can identify the output voltage directly. After acquiring the digital output voltage, the controller calculates the average value of the output voltage, e.g. the output voltage is acquired by a set frequency, and the acquired output voltages are accumulated and then divided by the number of acquisition times to obtain the average value.

Since calculation of the average value of the output voltage is simpler than calculation of the effective value of the output voltage, the controller may calculate the average value of the output voltage independently. Of course, the effective value of the output voltage may be also calculated by a controller with strong calculating ability.

Step 203: compare the average value of the output voltage with a target voltage value or compare the effective value of the output voltage with a target voltage value.

Step 204: according to the comparison results, adjust the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have pulse frequency f drive switching devices in an inverter unit to enable the inverter unit to output modulated wave with a pulse frequency 2f.

In the multiple-frequency inversion method for the internal combustion engine driven generator of the present invention, the inverter unit employs a multiple-frequency inversion technology, controlling the inverter unit through a low switching frequency f to obtain a 2f modulated frequency, thus resolving the problem that a low frequency switching component generates a high frequency modulated waveform. Four switching devices in the inverter unit have the same working frequency, alleviating the controller load. In addition, a high modulated frequency reduces the device parameters of the filter unit, resulting in a smaller-sized and lighter apparatus, thus giving the generator portability. Reduction of the device parameters of the filter unit means reduction of the output internal resistance of the generator, therefore increasing the non-linear load capability of the generator and ensuring a good sinusoidal voltage of the generator with a load with a large harmonic current.

It should be noted that the method provided by the present invention judges by using the average value of the output voltage, thus alleviating the computational load, so that the control unit is provided with more resources to process other events. However, the average value can be detected precisely only when the waveform distortion of the output voltage is in a certain range. Since the present invention applies a multiple-frequency inversion manner, the waveform distortion of the generator is relatively small under a linear load. Therefore, an average value sampling method can satisfy the precision requirement of voltage regulation.

How PWM waveforms which control the states of switching devices in a conversion unit are generated will be described in details below in combination with waveform diagrams.

Figure 3:
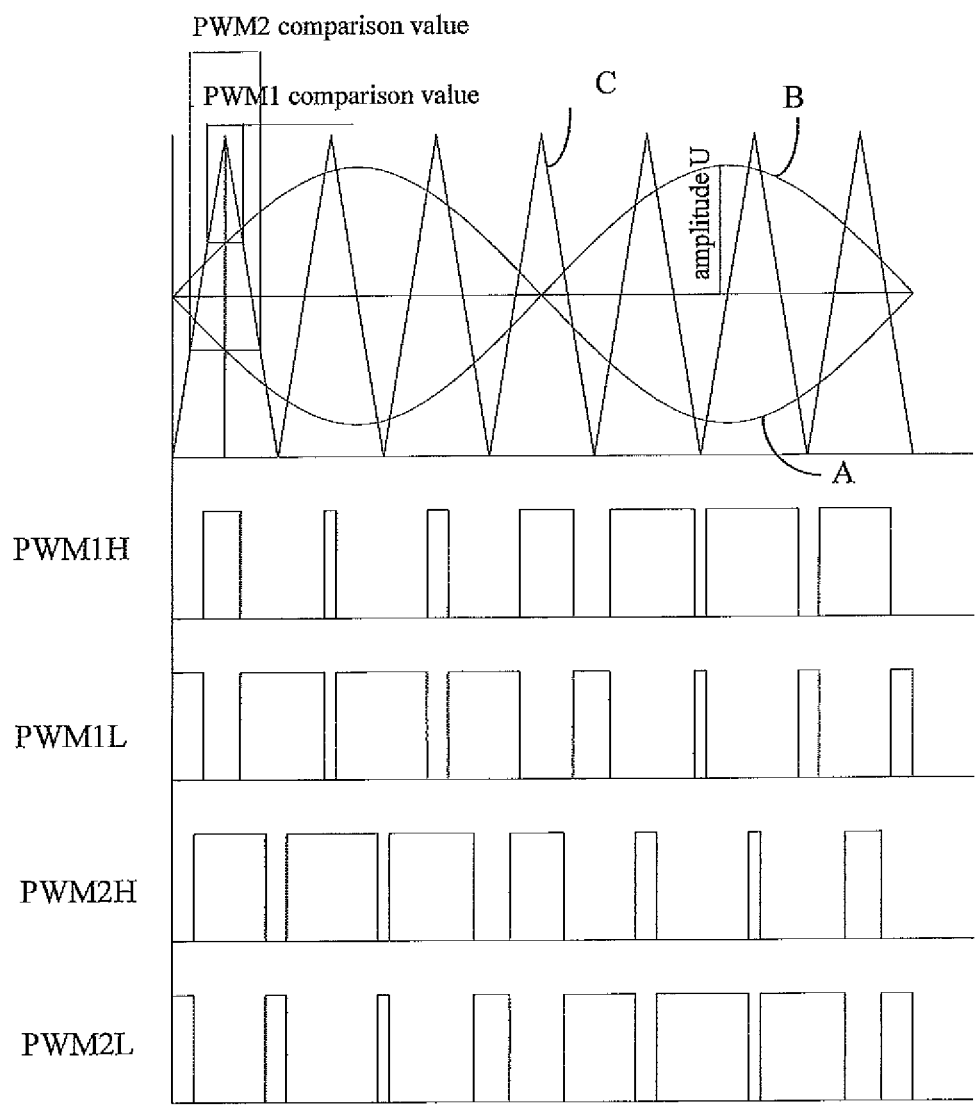
FIG. 3 is a multiple-frequency inversion waveform diagram provided by the present invention.

Referring to FIG. 3, the figure is a multiple-frequency inversion waveform diagram provided by the present invention, Wherein, sine wave A and sine wave B are two sine waves with a 180-degree phase difference.

The frequency of triangle wave C is f, and it can be learned from FIG. 3 that triangle wave C is modulated with sine wave A to generate PWM1H and modulated with sine wave B to generate PWM2H in each period of triangle wave C, Wherein a complementary waveform of PWM1H is PWM1L, and a complementary waveform of PWM2H is PWM2L.

The pulse period of the four PWM waves, PWM1H, PWM1L, PWM2H and PWM2L are also f. Four switching devices in an inverter unit are driven by the four PWM waves so as to make the switching devices turn on or off. It should be noted that the inverter unit in the present embodiment is a full bridge inverter unit.

Figure 4:
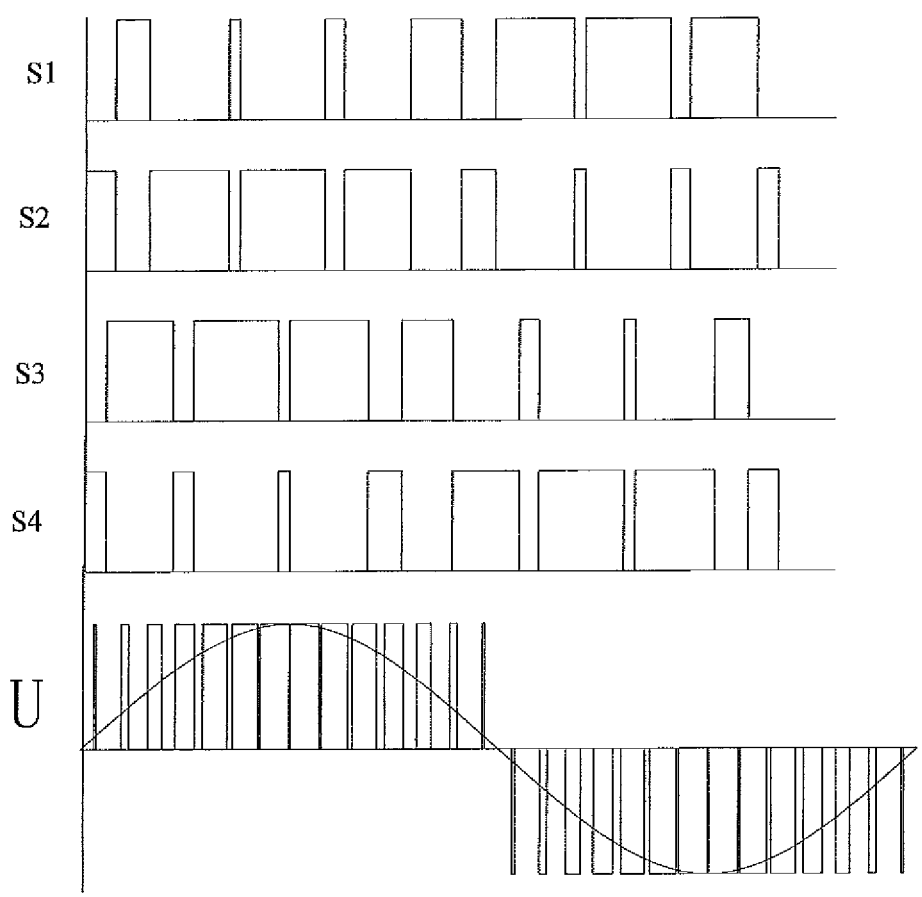
FIG. 4 is a waveform diagram of driving signals and an output voltage of switching devices provided by the present invention.

The four switching devices in the inverter unit are respectively represented by S1, S2, S3 and S4, then waveforms of driving signals of the four switching devices are as shown in FIG. 4. Output waveforms of the inverter unit are represented by U in FIG. 4 and U represents sine wave of the output voltage. The frequency of U has been multiplied into 2f.

It should be noted that triangle wave C is generated by a PWM generating module in the controller.

Sine wave A and sine wave B are obtained by internal programs of the controller, specifically a discrete table of sine changing according to sine. The output voltage of a filter unit may be adjusted by adjusting the proportionality coefficient of the sine in the sine waves.

The prevent invention performs controlling through voltage PI control and current PI control at the same time. Voltage PI control mainly controls the output voltage and current PI control mainly controls the revolving speed of the internal combustion engine.

How to perform current PI control will be introduced below.

Figure 5:
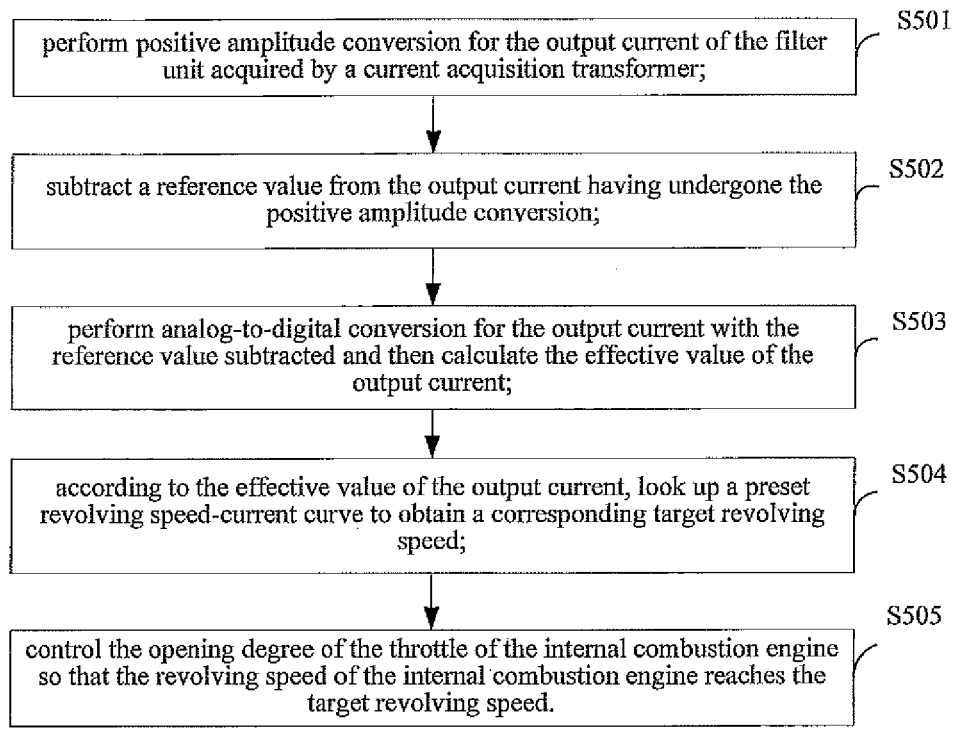
FIG. 5 is a flowchart of a PI control method of a current external loop during multiple-frequency inversion of the present invention.

Referring to FIG. 5, the figure is a flowchart of a current PI control method during multiple-frequency inversion of the present invention.

Figure 6:
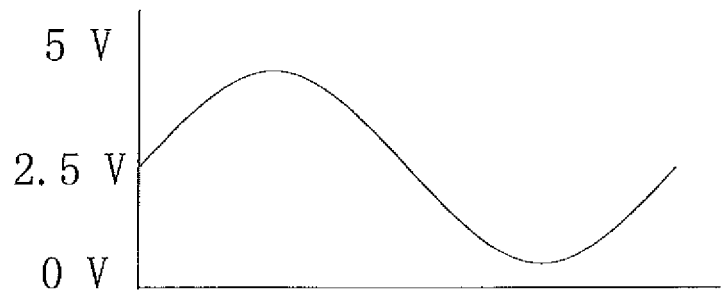
FIG. 6 is a schematic diagram illustrating positive amplitude conversion of an output current of the present invention.

The current PI control method during multiple-frequency inversion of the present embodiment includes:

Step 501: perform positive amplitude conversion for the output current of a filter unit acquired by a current acquisition transformer; since the output current of the filter unit is also an alternating current signal, a positive or negative alternating current signal needs to be converted into a positive signal to be acquired by a controller. As shown in FIG. 6, the zero-crossing point of the output current is 2.5V.

Step 502: subtract a reference value from the output current having undergone the positive amplitude conversion; since the output current is increased by 2.5V totally during the positive amplitude conversion, a reference value of 2.5V needs to be further subtracted.

Step 503: perform analog-to-digital conversion for the output current with the reference value subtracted and then calculate the effective value of the output current; analog-to-digital conversion needs to be performed for the output current so that the controller can calculate the output current.

Step 504: according to the effective value of the output current, look up a preset revolving speed-current curve to obtain a corresponding target revolving speed.

Step 505: control the opening degree of the throttle of the internal combustion engine so that the revolving speed of the internal combustion engine reaches the target revolving speed.

Based on the multiple-frequency inversion method for the internal combustion engine driven generator above, the present invention further provides a multiple-frequency inversion apparatus for an internal combustion engine driven generator. Components of the apparatus will be described in details below in combination with specific embodiments.

Figure 7:
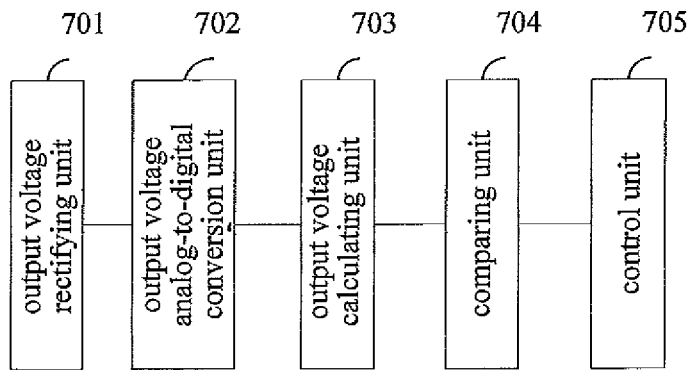
FIG. 7 is a structural diagram of the first embodiment of a multiple-frequency inversion apparatus for an internal combustion engine driven generator of the present invention.

Referring to FIG. 7, the figure is a structural diagram of the first embodiment of a multiple-frequency inversion apparatus for an internal combustion engine driven generator of the present invention.

The multiple-frequency inversion apparatus for the internal combustion engine driven generator of the present invention includes: an output voltage rectifying unit 701 configured to rectify the output voltage of a filter unit; an output voltage analog-to-digital conversion unit 702 configured to perform analog-to-digital conversion for the rectified output voltage; an output voltage calculating unit 703 configured to calculate the average value for the output voltage or the effective value for the output voltage according to the output voltage having undergone the analog-to-digital conversion; a comparing unit 704 configured to compare the average value of the output voltage with a target voltage value or compare the effective value of the output voltage with a target voltage value; a control unit 705 configured to, according to the comparison results, adjust the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have pulse frequency f drive switching devices in an inverter unit to enable the inverter unit to output modulated wave with a pulse frequency 2f.

In the multiple-frequency inversion apparatus for the internal combustion engine driven generator of the present invention, the inverter unit employs a multiple-frequency inversion technology, controlling the inverter unit through a low switching frequency f to obtain a 2f modulated frequency, thus resolving the problem that a low frequency switching component generates a high frequency modulated waveform. Four switching devices in the inverter unit have the same working frequency, alleviating the controller load. In addition, a high modulated frequency reduces the device parameters of the filter unit, resulting in a smaller-sized and lighter apparatus, thus giving the generator portability. Reduction of the device parameters of the filter unit means reduction of the output internal resistance of the generator, therefore increasing the non-linear load capability of the generator and ensuring a good sinusoidal voltage of the generator with a load with a large harmonic current.

The prevent invention performs controlling through voltage PI control and current PI control at the same time. Voltage PI control mainly controls the output voltage and current PI control mainly controls the revolving speed of the internal combustion engine.

How to perform current PI control will be introduced below.

Figure 8:
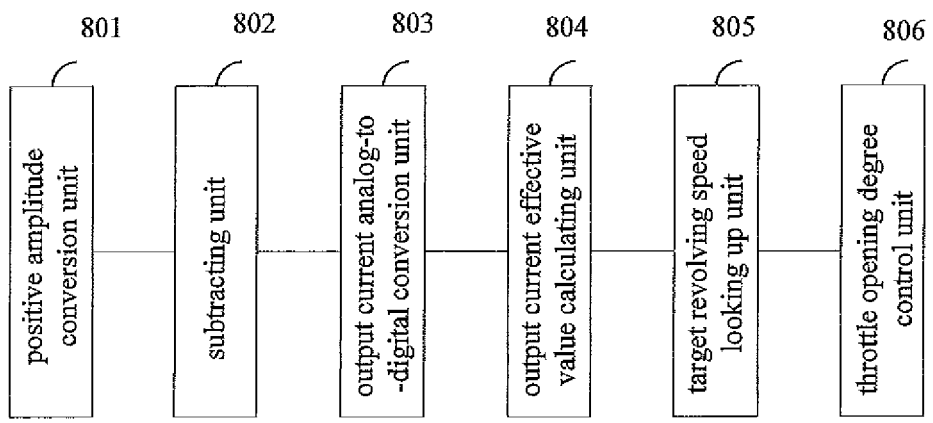
FIG. 8 is a structural diagram of the second embodiment of an apparatus provided by the present invention.

Referring to FIG. 8, the figure is a structural diagram of the second embodiment of an apparatus provided by the present invention.

A positive amplitude conversion unit 801 is configured to perform positive amplitude conversion for the output current of a filter unit; a subtracting unit 802 is configured to subtract a reference value from the output current having undergone the positive amplitude conversion; an output current analog-to-digital conversion 803 is configured to perform analog-to-digital conversion for the output current with the reference value subtracted; an output current effective value calculating unit 804 is configured to calculate the effective value of the output current according to the output current having undergone the analog-to-digital conversion; a target revolving speed looking up unit 805 is configured to, according to the effective value of the output current, look up a preset revolving speed current curve to obtain a corresponding target revolving speed; a throttle opening degree control unit 806 is configured to control the opening degree of the throttle of the internal combustion engine so that the revolving speed of the internal combustion engine reaches the target revolving speed.

The filter unit is a LC low-pass filter. Since the frequency of the output voltage of the inverter unit is 2f, the values of inductors and capacitors in the LC low-pass filter can be reduced to reduce the volume of the filter unit. In addition, reduction of the L and C values means reduction of the output internal resistance of the generator, therefore increasing the non-linear load capability of the generator.

The above are merely the preferred embodiments of the present invention and are not intended to limit the present invention in any form. Although the present invention has been disclosed by the preferred embodiments as mentioned above, the preferred embodiments are not used for limiting the present invention. Many possible variations and modifications may be made to the technical solutions of the present invention, or the technical solutions of the present invention may be modified into equivalent embodiments changed equivalently, without departing from the scope of the technical solutions of the present invention by any person skilled in the art by using the methods and technical contents as disclosed above. Therefore, any simple modifications, equivalent changes and modifications made to the embodiments above according to the technical essence of the present invention without departing from the contents of the technical solutions of the present invention shall belong to the scope of protection of the technical solutions of the present invention.

The invention claimed is:

1. A multiple-frequency inversion apparatus for an internal combustion engine driven generator, wherein it comprises:
   an output voltage rectifying unit configured to rectify the output voltage of a filter unit;
   an output voltage analog-to-digital conversion unit configured to perform analog-to-digital conversion for the rectified output voltage;
   an output voltage calculating unit configured to calculate the average value of the output voltage or the effective value of the output voltage according to the output voltage having undergone the analog-to-digital conversion;
   a comparing unit configured to compare the average value of the output voltage with a target voltage value or compare the effective value of the output voltage with a target voltage value;
   a control unit configured to, according to the comparison results, adjust the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching tubes in an inverter unit to enable the inverter unit to output modulated wave with a pulse frequency 2f.

2. The multiple-frequency inversion apparatus for an internal combustion engine driven generator according to claim 1, wherein it further comprises:
   a positive amplitude conversion unit configured to perform positive amplitude conversion for the output current of the filter unit;
   a subtracting unit configured to subtract a reference value from the output current having undergone the positive amplitude conversion;
   an output current analog-to-digital conversion configured to perform analog-to-digital conversion for the output current with the reference value subtracted;

an output current effective value calculating unit configured to calculate the effective value of the output current according to the output current having undergone the analog-to-digital conversion;

a target revolving speed looking up unit configured to, according to the effective value of the output current, look up a preset revolving speed-current curve to obtain a corresponding target revolving speed;

a throttle opening degree control unit configured to control the opening degree of the throttle of the internal combustion engine so that the revolving speed of the internal combustion engine reaches the target revolving speed.

3. The multiple-frequency inversion apparatus for an internal combustion engine driven generator according to claim 2, wherein the filter unit is a LC low-pass filter.

4. The multiple-frequency inversion apparatus for an internal combustion engine driven generator according to claim 1, wherein the filter unit is a LC low-pass filter.

5. A multiple-frequency inversion method for an internal combustion engine driven generator, wherein it comprises:

rectifying the output voltage of a filter unit;

after performing analog-to-digital conversion for the rectified output voltage, calculating the average value of the output voltage or the effective value of the output voltage;

comparing the average value of the output voltage with a target voltage value or comparing the effective value of the output voltage with a target voltage value;

according to the comparison results, adjusting the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching tubes in an inverter unit to enable the inverter unit to output modulated wave with a pulse frequency 2f.

6. The multiple-frequency inversion method for an internal combustion engine driven generator according to claim 5, wherein it further comprises:

performing positive amplitude conversion for the output current of the filter unit acquired by a current acquisition transformer;

subtracting a reference value from the output current having undergone the positive amplitude conversion;

performing analog-to-digital conversion for the output current with the reference value subtracted and then calculating the effective value of the output current;

according to the effective value of the output current, looking up a preset revolving speed-current curve to obtain a corresponding target revolving speed;

controlling the opening degree of the throttle of the internal combustion engine so that the revolving speed of the internal combustion engine reaches the target revolving speed.

7. The multiple-frequency inversion method for an internal combustion engine driven generator according to claim 6, wherein the filter unit is a LC low-pass filter.

8. The multiple-frequency inversion method for an internal combustion engine driven generator according to claim 5, wherein the filter unit is a LC low-pass filter.

9. A control apparatus for an internal combustion engine driven generator, configured to control the internal combustion engine driven generator, wherein the internal combustion engine, which functions as a prime motor, drives the generator to generate electricity, and an alternating current outputted by the generator is rectified into a direct current by a rectifying unit, and the direct current is outputted to an inverter unit subsequently; controlled by a controller, the inverter unit inverts the direct current into a required alternating current which is provided to a load after being filtered by a filter unit; the controller controls the opening degree of the throttle of the internal combustion engine through a throttle controller so as to control the output current; the controller controls the states of switching tubes of the inverter unit through PWM wave, wherein the apparatus comprises:

an output voltage calculating unit configured to rectify the output voltage of the filter unit over again, after performing analog-to-digital conversion for the rectified output voltage, calculate the average value or the effective value of the output voltage;

a comparing unit configured to compare the average value of the output voltage with a target value thereof or compare the effective value of the output voltage with a target value thereof;

a control unit configured to, according to the comparison results, adjust the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching tubes in an inverter unit to enable the inverter unit to output modulated wave with a pulse frequency 2f.

10. The control apparatus for an internal combustion engine driven generator according to claim 9, wherein the apparatus further comprises:

an output current effective value calculating unit configured to, after performing analog-to-digital conversion for the output current of the filter unit acquired by a current acquisition transformer, calculate the effective value of the output current;

a target revolving speed looking up unit configured to, according to the effective value of the output current, look up a preset revolving speed-current curve to obtain a corresponding target revolving speed;

a throttle opening degree control unit configured to control the opening degree of the throttle of the internal combustion engine so that the revolving speed of the internal combustion engine reaches the target revolving speed to control the output current.

11. The control apparatus for an internal combustion engine driven generator according to claim 10, wherein the filter unit is a LC low-pass filter.

12. The control apparatus for an internal combustion engine driven generator according to claim 8, wherein the filter unit is a LC low-pass filter.

13. A control method for an internal combustion engine driven generator, wherein, the internal combustion engine, which functions as a prime motor, drives the generator to generate electricity, and an alternating current outputted by the generator is rectified into a direct current by a rectifying unit, and the direct current is outputted to an inverter unit subsequently; controlled by a controller, the inverter unit inverts the direct current into a required alternating current which is provided to a load after being filtered by a filter unit; the controller controls the opening degree of the throttle of the internal combustion engine through a throttle controller so as to control the output current; the controller controls the states of switching tubes of the inverter unit through PWM wave, wherein the method further comprises:

rectifying the output voltage of the filter unit over again, after performing analog-to-digital conversion for the rectified output voltage, calculating the average value or the effective value of the output voltage;

comparing the average value of the output voltage with a target value thereof or comparing the effective value of the output voltage with a target voltage value thereof;

according to the comparison results, adjusting the proportionality coefficient of two sine with a 180-degree phase difference in a table of sine until the average value or the effective value of the output voltage falls within a preset range of the target voltage value; the table of sine is used for generating two sine waves with a 180-degree phase difference, and the two sine waves with a 180-degree phase difference are compared with a triangle wave to generate four PWM waves which have pulse frequency f, and the triangle wave has a frequency f; the four PWM waves which have frequency f drive switching tubes in an inverter unit to enable the inverter unit to output modulated wave with a pulse frequency 2f.

14. The control method for an internal combustion engine driven generator according to claim 13, wherein the method further comprises:

performing analog-to-digital conversion for the output current of the filter unit acquired by a current acquisition transformer and then calculating the effective value of the output current;

according to the effective value of the output current, looking up a preset revolving speed-current curve to obtain a corresponding target revolving speed;

controlling the opening degree of the throttle of the internal combustion engine so that the revolving speed of the internal combustion engine reaches the target revolving speed so as to control the output current.

15. The control method for an internal combustion engine driven generator according to claim 14, wherein the filter unit is a LC low-pass filter.

16. The control method for an internal combustion engine driven generator according to claim 13, wherein the filter unit is a LC low-pass filter.

* * * * *